United States Patent
Jain

(10) Patent No.: US 12,536,360 B2
(45) Date of Patent: Jan. 27, 2026

(54) BOUNDARY CELL HAVING A COMMON SEMICONDUCTOR TYPE FOR LIBRARY CELL

(71) Applicant: Synopsys, Inc., Mountain View, CA (US)

(72) Inventor: Arpit Jain, Alwar (IN)

(73) Assignee: Synopsys, Inc., Sunnyvale, CA (US)

( * ) Notice: Subject to any disclaimer, the term of this patent is extended or adjusted under 35 U.S.C. 154(b) by 661 days.

(21) Appl. No.: 17/873,015

(22) Filed: Jul. 25, 2022

(65) Prior Publication Data

US 2023/0022615 A1    Jan. 26, 2023

(30) Foreign Application Priority Data

Jul. 26, 2021  (IN) .............. 202141033411

(51) Int. Cl.
*G06F 30/392*    (2020.01)
*G06F 30/3953*   (2020.01)

(52) U.S. Cl.
CPC ........ *G06F 30/392* (2020.01); *G06F 30/3953* (2020.01)

(58) Field of Classification Search
CPC .................................................... G06F 30/392
USPC ........................................................ 716/119
See application file for complete search history.

(56) References Cited

U.S. PATENT DOCUMENTS

2022/0229965 A1*  7/2022  Cho .............. H10D 89/10

\* cited by examiner

*Primary Examiner* — Eric D Lee
(74) *Attorney, Agent, or Firm* — Patterson + Sheridan, LLP

(57) ABSTRACT

Boundary cells are used to abut two standard cell blocks. A standard cell block for an integrated circuit device includes a first standard cell, and a first boundary cell disposed adjacent to the first standard cell and along a boundary of the standard cell block. The first boundary cell includes a first region, a first dummy region, and a first layer extension region. The first region is abutted with the first standard cell and the first dummy region. The first dummy region is abutted with the first layer extension region. The first region and the first dummy region each include one or more non-functional layers. The first region, the first dummy region, and the first layer extension region are of a first semiconductor type.

20 Claims, 6 Drawing Sheets

BOUNDARY CELL HAVING A COMMON SEMICONDUCTOR TYPE FOR LIBRARY CELL

RELATED APPLICATION

This application claims the benefit of Indian provisional patent application serial number 202141033411, filed Jul. 26, 2021, which is hereby incorporated herein by reference.

TECHNICAL FIELD

The present disclosure generally relates to a library cell design system. In particular, the present disclosure relates to a system and method for providing a boundary cell having a common semiconductor type for vertical abutment configurations of a library cell block.

BACKGROUND

In a semiconductor device manufacturing process, library cells (also referred to as standard cells herein) are used during the semiconductor device manufacturing process to meet time to market requirements, while supporting ease of design and technology changes. A standard cell is a digital logic element with a specified functionality. Standard cells have a fixed height. The width of the standard cell is a multiple of a minimum width for a particular process technology. Multiple rows of standard cells are used to design a standard cell block. Standard cell blocks are abutted with each other to design larger cell blocks. The standard cell blocks may be abutted on the left or right of each other (e.g., horizontal abutment), or on top or bottom of each other (e.g., vertical abutment). Boundary cells are placed in the standard cell blocks at the boundary between standard cell blocks to satisfy design rule constraints.

SUMMARY

In one example, a standard cell block for an integrated circuit device includes a first standard cell, and a first boundary cell disposed adjacent to the first standard cell and along a boundary of the standard cell block. The first boundary cell includes a first region, a first dummy region, and a first layer extension region. The first region is abutted with the first standard cell and the first dummy region. The first dummy region is abutted with the first layer extension region. The first region and the first dummy region each include one or more non-functional layers. The first region, the first dummy region, and the first layer extension region are of a first semiconductor type.

In one example, a non-transitory computer readable medium includes stored instructions. The stored instructions, when executed by a processor, cause the processor to provide a first standard cell block. The first standard cell block includes a first standard cell of a standard cell library based on a circuit design, and a first boundary cell. The first boundary cell is disposed adjacent to the first standard cell and along a boundary of the first standard cell block. The first boundary cell includes a first region, a first dummy region, and a first layer extension region. The first region is abutted with the first standard cell and the first dummy region. The first dummy region is abutted with the first layer extension region. The first region and the first dummy region each include one or more non-functional layers. The first region, the first dummy region, and the first layer extension region are of a first semiconductor type.

In one example, a method includes placing a first standard cell of a standard cell library within a first standard cell block of a plurality of standard cell blocks. Further, the method includes placing a first boundary cell along a boundary of the first standard cell block. The first boundary cell includes a first region abutting a second region of the first standard cell. Further, the first boundary cell includes a first dummy region abutting the first region. Each of the first dummy region and the first region include a non-functional layer. The first boundary cell further includes a first layer extension region abutting the first dummy region. The first region, the first dummy region, the first layer extension region, and the second region are of a first semiconductor type.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
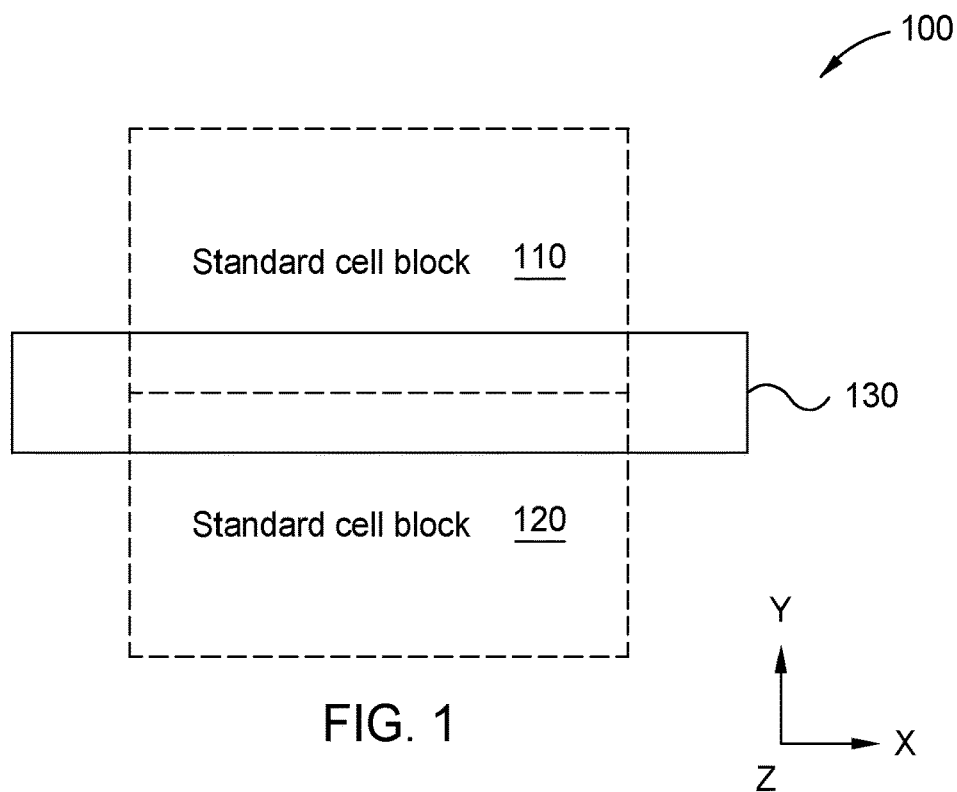
FIG. 1 illustrates vertical abutment of two standard cell blocks in accordance with some embodiments of the present disclosure.

Aspects of the present disclosure relate to a boundary cell having a common semiconductor type for a standard cell block.

In the semiconductor manufacturing process, standard cells and boundary cells are used to form standard cell blocks. The boundary cells are disposed along the boundary of a standard cell block, and where the standard cell block interfaces with other standard cell blocks. The boundary cells are designed to ensure that when two standard cells are abutted with each other, there is no gap formed between the layers of the standard cell blocks and that design rule check (DRC) is satisfied. However, in many instances, the boundary cells introduce white space between the standard cell blocks, increasing the circuit area of the corresponding semiconductor device, increasing the manufacturing costs of the corresponding semiconductor device.

The boundary cell as described herein is formed by three regions of the same semiconductor type. For example, the boundary cell includes a first region, a dummy region, and a layer extension region formed from the same semiconductor type (positive (p)-type or negative (n)-type). When two standard cell blocks are abutted with each other, the boundary cells are overlapped with each other along a pick and place (P&R) boundary. As the regions of the boundary cells are made up of the same semiconductor type, the overlapping areas are merged with each other.

Technical advantages of the present disclosure include, but are not limited to, a boundary cell that reduces the white space between standard cell blocks, reducing the circuit area of a corresponding semiconductor device, reducing the manufacturing cost of the semiconductor device. The boundary cells of the present disclosure are used to abut standard cell blocks in a vertical direction (e.g., the Y direction of FIG. 1). Further, the boundary cells of the present disclosure include multiple regions, each formed from the same semiconductor type satisfying DRC in a vertical abutment scenario and reducing white space introduced by the boundary cells.

Standard cells are used in semiconductor manufacturing processes. Standard cells streamline the semiconductor design process as the use of standard cells improves time to market constraints, while supporting design and technology improvements. The standard cells are part of a standard cell library. The standard cell library is associated with a semiconductor device manufacturing technology process. The standard cells are used to build standard cell blocks that are interconnected to perform the overall functionality of a corresponding circuit design.

A standard cell is a digital logic element with a specified functionality and a fixed height. The width of the standard cell is a multiple of a value supported by the corresponding manufacturing process or technology. A standard cell includes a group of transistors and interconnect structures that provide a logic function and/or storage function. In one or more examples, standard cells include logic gates (e.g., AND logic gates, OR logic gates, XOR logic gates, and XNOR logic gates, among others). In other examples, the standard cells includes inverter circuit elements, adder circuit elements, and multiplexer circuit elements, among others.

The standard cells are used to convert a circuit design between design representations during the semiconductor manufacturing process. For example, the standard cells are used to convert a circuit design from a register-transfer level (RTL) representation to a gate-level netlist representation. In one or more examples, converting a circuit design from an RTL file to a gate-level netlist representation includes placing standard cells within standard cell blocks based on the circuit design. Multiple rows of standard cells form a standard cell block of a circuit design. Standard cell blocks are abutted with each other to design larger blocks. For example, in a two dimensional X, Y plane, standard cells blocks may be abutted in the Y direction (e.g., a horizontal direction) or the X direction (e.g., a vertical direction) to form the larger standard cell block.

The manufacturing cost of a semiconductor device at least partially corresponds to the circuit area used to form the semiconductor device. In various examples, reducing the standard geometrical size of the elements of a semiconductor device, reduces the circuit area associated with the semiconductor device, decreasing the manufacturing cost of the semiconductor device. Further, decreasing the circuit area associated with a semiconductor device allows for an increased number of semiconductor devices to be manufactured from a single integrated circuit (IC) wafer or substrate, decreasing the associated manufacturing cost.

While the circuit area of the semiconductor device may be reduced by reducing the standard geometrical size of the elements of the semiconductor device, during the circuit design synthesis process white space (e.g., unused or empty space) is added between abutted standard cell blocks to satisfy the DRC of the corresponding design and manufacturing process. The white space increases the circuit area of the semiconductor device, increasing the manufacturing cost of the semiconductor device.

The DRC is used to verify that the corresponding semiconductor design falls within the parameters of the corresponding manufacturing process and technology node. In one example, two standard cell blocks are abutted to each other in a Y direction (e.g., vertical direction) of a two dimensional X, Y plane. In such an arrangement, the DRC occurs at the point of where the two standard cell blocks interface with each other. Accordingly, the region where two standard cell blocks interface with each other is referred to as an interface DRC region. FIG. 1 illustrates one such example. As illustrated in FIG. 1, the standard cell blocks 110 and 120 of an integrated circuit (IC) device are vertically abutted with each other in the Y direction. The interface DRC region 130 is formed where the standard cell blocks 110 and 120 are abutted, and interface, with each other.

Each standard cell block includes boundary cells that are disposed along the boundary of the standard cell block and where the standard cell blocks interface other standard cell blocks. For example, the standard cell blocks 110 and 120 include boundary cells that are disposed along the interface DRC region 130. Boundary cells enable the abutment of standard cell blocks. A boundary cell is a nonfunctional cell that allows standard cell blocks to abut with each other while resolving the DRC. As the boundary cells are nonfunctional cells, the boundary cells are designed differently than the standard cells. For example, a boundary cell include a dummy region (e.g., a dummy part). The dummy regions but do not have any logic and/or circuit related functionality (e.g., transistors are not formed within the dummy regions). The dummy regions enable the boundary cells to abut two corresponding standard cell blocks. The boundary cells are designed to ensure that there no gap is formed between layers of the standard cell blocks and no DRC error occurs at the boundaries between standard cell blocks (e.g., the standard cell blocks 110 and 120). However, in many instances, the boundary cells introduce white space between the standard cell blocks (e.g., the standard cell blocks 110 and 120), increasing the circuit area of the corresponding semiconductor device, increasing the manufacturing costs of the corresponding semiconductor device.

Figure 2:
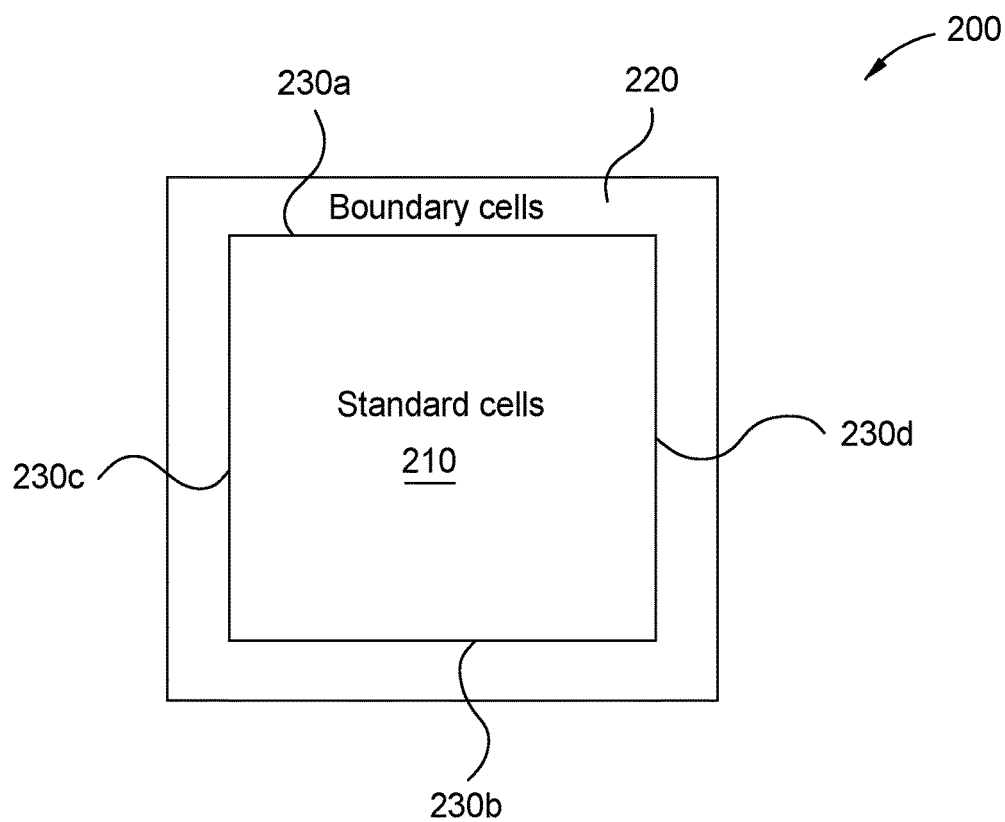
FIG. 2 illustrates standard cells and boundary cells of a standard cell block in accordance with some embodiments of the present disclosure.

FIG. 2 illustrates a standard cell block 200 of an IC device, according to one or more examples. The standard cell block 200 includes a plurality of standard cells 210 and a plurality of boundary cells within the boundary cells 220. The standard cells 210 include one or more standard cells of standard cell library. In one or more examples, the standard cells 210 include a combination of different standard cells associated with different types of logic gates and/or other functional blocks. The standard cells 210 are interconnected to perform a high level function of the standard cell block 200.

Figure 3:
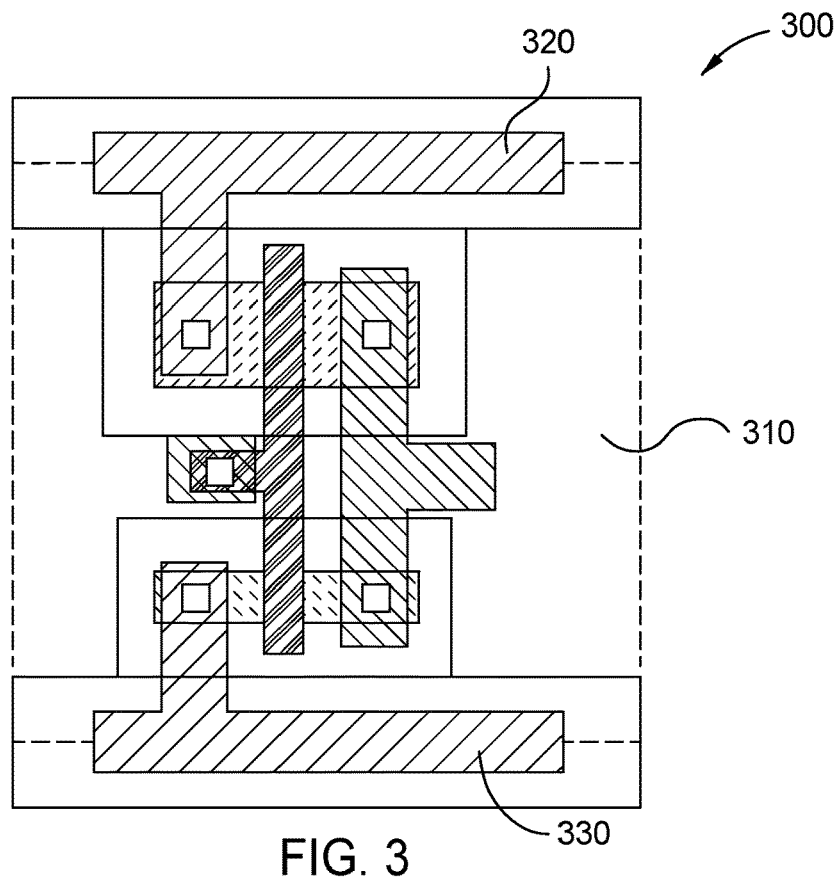
FIG. 3 illustrates a standard cell of a standard cell library in accordance with some embodiments of the present disclosure.

FIG. 3 illustrates an example standard cell 300 configured as an inverter cell. The standard cell 300 includes one or more interconnected metal layers 310. The interconnected metal layers 310 are connected between a first power supply line 320 and a second power supply line 330. The configuration of the interconnected metal layers 310 provides the functionality of the standard cell 300. The first power supply line 320 is driven with a first power supply voltage and the second power supply line 330 is driven with a second power supply voltage. The voltage level of the first power supply voltage is greater than the voltage level of the second power supply voltage. The first power supply voltage may be referred to as a voltage supply (VDD) and the second power supply voltage may be referred to as ground voltage (GND).

The first power supply line 320 is routed within a layer of a region of a semiconductor device having a p-type or n-type semiconductor type. The second power supply line 330 is routed within a region of the semiconductor device having an opposite semiconductor type to the region having the first power supply line 320.

Figure 4:
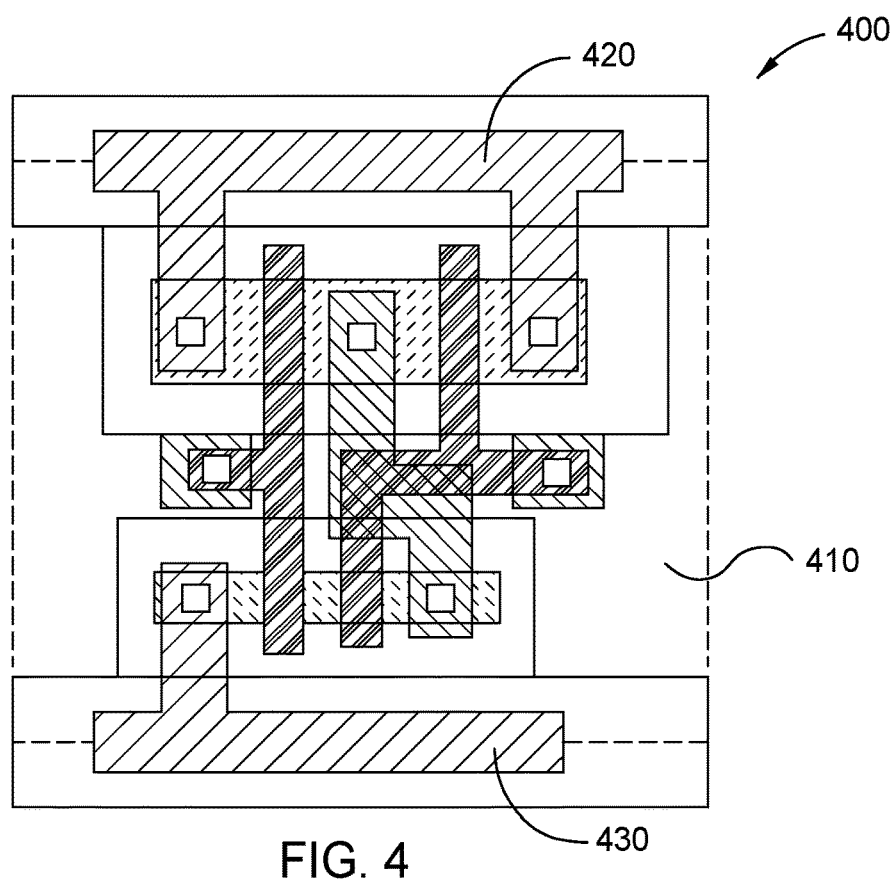
FIG. 4 illustrates a standard cell of a standard cell library in accordance with some embodiments of the present disclosure.

FIG. 4 illustrates another example standard cell 400 configured as an NAND cell. The standard cell 400 includes one or more interconnected metal layers 410. The interconnected metal layers 410 are connected between a first power supply line 420 and a second power supply line 430. The configuration of the interconnected metal layers 410 provides the functionality of the standard cell 400. As is described with regard to the standard cell 300 of FIG. 3, the first power supply line 420 is driven with a first power supply voltage and the second power supply line 430 is driven with a second power supply voltage.

The first power supply line 420 is routed within a layer of a region of a semiconductor device having a p-type or n-type semiconductor type. The second power supply line 430 is routed within a region of the semiconductor device having an opposite semiconductor type to the region having the first power supply line 420.

FIG. 3 and FIG. 4 illustrate two example standard cells that can be used within the standard cell 210 of the standard cell block 200. However, the standard cells 210 are not limited to the same types of standard cells 300 and 400 illustrated in FIGS. 3 and 4. Further, in one or more examples, the standard cells 210 include multiple (e.g., thousands) of standard cells of two or more types that are placed in rows and interconnected to form the standard cells 210.

With further reference to FIG. 2, the boundary cells 220 are disposed along the boundary of the standard cell block 200 and along the outer edges, or boundary, of the standard cell block 200. Further, the boundary cells 220 are disposed adjacent, and abutted, with the standard cells 210. The standard cells 210 are arranged based on the associated semiconductor design and design of the standard cell block. For example, the standard cell arrangement may be determined by an electronic design automation (EDA) device. In one example, the boundary cells 220 disposed along vertical boundaries 230a and 230b differ from that of the boundary cells 220 along the horizontal boundaries 230c and 230d. For example, the boundary cells 220 disposed along vertical boundaries 230a and 230b may have a different configuration (e.g., formed of regions having a different configuration of semiconductor types) from that of the boundary cells 220 disposed along the horizontal boundaries 230c and 230d. In one or more example, the DRC of the horizontal boundaries 230c and 230d differ from the DRC of the vertical boundaries 230a and 230b. Accordingly, the boundary cells 220 along the horizontal boundaries 230c and 230d have a configuration that satisfies the respective DRC, and which differs from the configurations of the boundary cells 220 along the vertical boundaries 230a and 230b.

Figure 5:
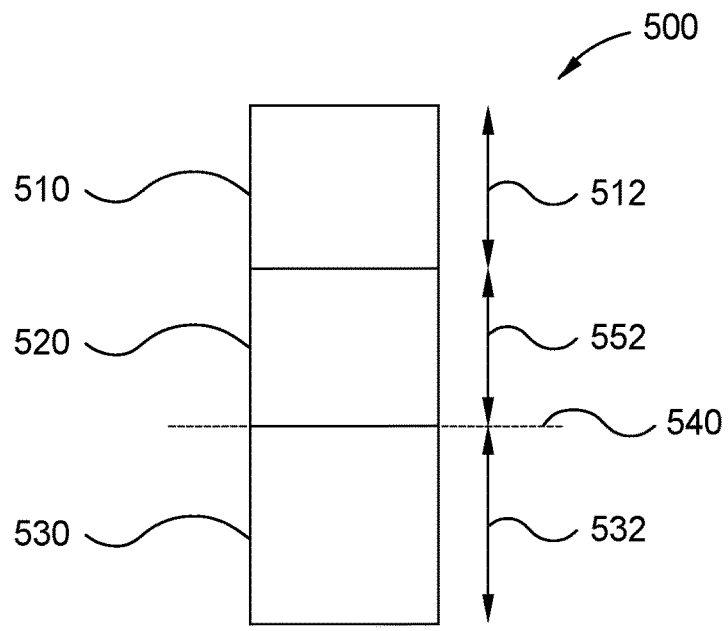
FIG. 5 illustrates the regions of a boundary cell of a standard cell library in accordance with some embodiments of the present disclosure.

FIG. 5 illustrates a boundary cell 500 for reducing the distance between vertically abutted standard cell blocks (e.g., the standard cell blocks 110 and 120 of FIG. 1) that is used along the vertical boundaries (e.g., the vertical boundaries 230a and 230b of FIG. 2) of a standard cell block. As is illustrated by FIG. 5, the boundary cell 500 includes a region 510, a dummy region 520, and a layer extension region 530. The dummy region 520 is disposed between the region 510 and the layer extension region 530. The boundary cell 500 includes three regions (e.g., the region 510, the dummy region 520, and the layer extension region 530) such that the corresponding standard cell block satisfies the associated DRC before being abutted with another standard cell block, and after being abutted with another standard cell block.

The region 510 is disposed adjacent to and abuts one or more of the standard cells of a corresponding standard cell block (e.g., the standard cells 210 of the standard cell block 200 of FIG. 2). The region 510 is a non-functional region including one or more non-functional layers. For example, transistors are not formed within the region 510 and the region 510 is not used to form functional logic. In one or more examples, the region 510 provides library architectural compatibility to adjacent functional standard cells and satisfies the DRC requirements. The region 510 includes one or more layers that are based on the corresponding semiconductor manufacturing process or technology. The region 510 is a p-type region or an n-type region.

The dummy region 520 is disposed between the region 510 and the layer extension region 530. The dummy region 520 is a non-functional region including one or more non-functional layers. For example, transistors are not formed within the dummy region 520, and the dummy region 520 is not used to form functional logic. The dummy region 520 is included to satisfy DRC requirements. In one example, the dummy region 520 includes one or more dummy layers that are defined by the corresponding semiconductor manufacturing process or technology. In one example, the dummy region 520 is a p-type region or an n-type region.

In one or more examples, the dummy region 520 further includes one or more layers (e.g., N-well layers, implant layers, and/or metal rail layer, among others) different from that of the region 510. For example, one of the region 510 and the dummy region 520 includes a different combination of N-well layers, implant layers, and metal rail (e.g., power supply lines) layers, among others from the other. The region 510 and the dummy region 520 include different combinations of N-well layers, implant layers, and/or metal rail layers, among others, based on the associated DRC.

The layer extension region 530 is defined as part of the DRC of the corresponding manufacturing process or technology. For example, the DRC may require the inclusion of the layer extension region 530 to satisfy manufacturing constraints. The layer extension region 530 includes one or more layers that are defined by the corresponding semiconductor manufacturing process. The layer extension region 530 is a p-type region or an n-type region.

In one example, a height 532 of the layer extension region 530 is greater than the height 512 of the region 510 and/or the height 522 of dummy region 520. Further, the height 512 of the region 510 and the height 522 of the dummy region 520 may be equal to each other.

A place and routing (P&R) boundary 540 is disposed between the dummy region 520 and the layer extension region 530. The P&R boundary is the abutment boundary where the abutment of the adjacent standard cell blocks (e.g., the standard cell blocks 110 and 120 of FIG. 1) occurs.

The region 510, the dummy region 520, and the layer extension region 530 of the boundary cell 500 are of all the same semiconductor type. In one example, the region 510, the dummy region 520, and the layer extension region 530 are p-type regions. In another example, the region 510, the dummy region 520, and the layer extension region 530 are n-type regions. By using the boundary cell 500 formed from the region 510, the dummy region 520, and a layer extension region 530 of the same semiconductor type (e.g., p-type or n-type) the overlap of layers of different semiconductor types is eliminated when abutting two standard cells blocks (e.g., the standard cell block 110 and 120 of FIG. 1). Accordingly, the white space between the abutted standard cell blocks is reduced, reducing the circuit area of the corresponding semiconductor device.

In one example, the boundary cell 500 is used for the vertical abutment (e.g., abutment in the Y direction as shown in FIGS. 1 and 2). The boundary cell 500 may be used on either a top boundary or a bottom boundary (e.g., boundaries 230a and 230b of FIG. 2) of a standard cell block (e.g., the standard cell block 200 of FIG. 2). Further, multiple boundary cells 500 may be placed adjacent to each other and the standard cells of a standard cell block (e.g., the standard cells 210 of the standard cell block 200. In one example, about 10 to about 90 boundary cells 500 are disposed along a vertical boundary of a standard cell block.

Figure 6:
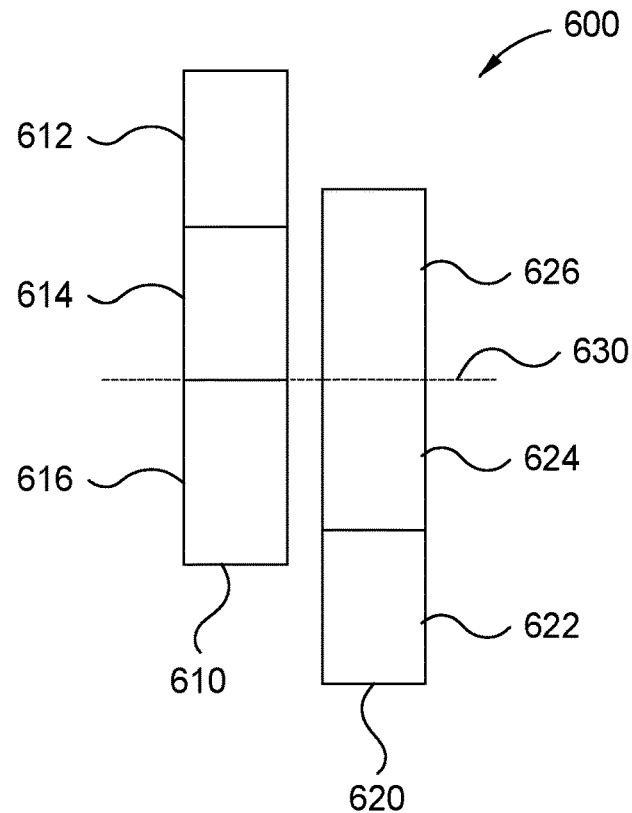
FIG. 6 illustrates two boundary cells of adjacent standard cell blocks in accordance with some embodiments of the present disclosure.
Figure 7:
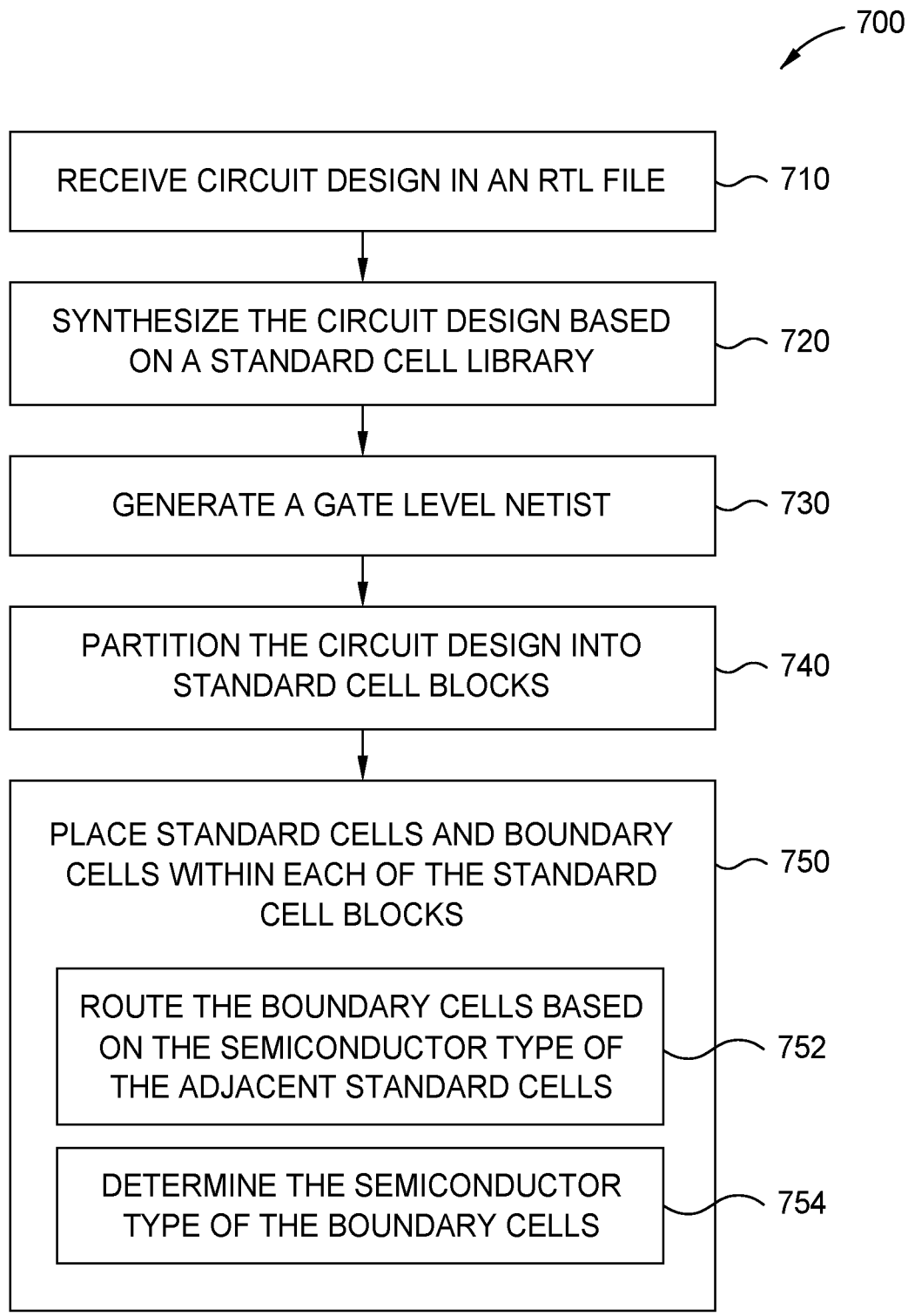
FIG. 7 illustrates a flowchart of a method for synthesizing a circuit design in accordance with some embodiments of the present disclosure.

FIG. 6 illustrates a vertical abutment configuration using boundary cells having different regions of a common semiconductor type as illustrated in FIG. 500. In one example, the scenario 600 of FIG. 6 is generated as part of the physical implementation process 824 of processes 800 of FIG. 8. In the scenario 600 of FIG. 6, the boundary cell 610 is part of a first standard cell block (e.g., the standard cell block 110 of FIG. 1), and the boundary cell 220 is part of a second standard cell block (e.g., the standard cell block 120 of FIG. 1). The boundary cell 610 is overlapped by the boundary cell 620 when vertically abutting the two corresponding standard cell blocks (e.g., the standard cell blocks 110 and 120 of FIG. 1). The boundary cell 620 is flipped (e.g., rotated 170 degrees) with reference to the boundary cell 610. Each of the boundary cells 610 and 620 include three different regions as described with regard to the boundary cell 500 of FIG. 5. For example, the boundary cell 610 includes the region 612, the dummy region 614, and layer extension region 616. The boundary cell includes region 622, the dummy region 624, and the layer extension region 626. The regions 612 and 622 are configured similar to the region 510 of FIG. 5, the dummy regions 614 and 624 are configured similar to the region 510 of FIG. 5, and the layer extension regions 616 and 626 are configured similar to the layer extension region 530 of FIG. The regions 612 and 622, the dummy regions 614 and 624, and the layer extension regions 616 and 626 are formed from the same semiconductor type. For example, the regions 612 and 622, the dummy regions 614 and 624, and the layer extension regions 616 and 626 are either of a p-type or n-type.

In one or more examples, the boundary cell 610 is overlapped with the boundary cell 620 when vertically abutting the corresponding standard cell blocks. The boundary cells 610 and 620 are aligned along the P&R boundary 630. Aligning the boundary cells 610 and 620 along the P&R boundary 630 satisfies the associated DRC when abutting the corresponding standard cell blocks. For example, the DRC may place constraints on the area and the layer to layer spacing, among others. As the boundary cells 610 and 620 are formed from regions 612-616 and 622-626 of the same semiconductor type, when the boundary cell 620 is overlapped with the boundary cell 610 to vertically abut (align or connect) the corresponding standard cell blocks, regions of the same semiconductor type overlap each other. Accordingly, the DRC is satisfied. When abutting two standard cells having boundary cells not formed from regions of a common semiconductor type, increased white area is introduced into the boundary area to ensure that layers of different semiconductor types do not overlap each other. Accordingly, a semiconductor device formed from boundary cells as illustrated in FIG. 5 and FIG. 6 has a reduced associated circuit area as compared to semiconductor devices having boundary cells formed from multiple semiconductor types (e.g., p-type and n-type).

When the layer extension regions 616 and 626 of the boundary cells 610 and 620 overlap regions within each other boundary cell 610 and 620, the overlapping regions are dissolved (e.g., merged) into one another as the overlapping regions have the same semiconductor type (e.g., a p-type or n-type). For example, when the layer extension region 626 overlaps the region 612 and the dummy region 614 of the boundary cell 610, the layer extension region 626 is dissolved (e.g., merged) within the first region 612 and the dummy region 614 as layer extension region 626, the region 612, and the dummy region 614 are formed from the same semiconductor type. Accordingly, the DRC associated with the corresponding semiconductor manufacturing process is satisfied.

Satisfying the DRC includes satisfying a rule corresponding the boundary cells of the abutted standard cell blocks ensuring that the semiconductor device including the abutted standard cell blocks can be manufactured using the corresponding manufacturing process. Further, white spaces (blank or unused spaces) between abutted two standard cell blocks are mitigated and the area associated with the abutted standard cell blocks is reduced.

8090FIG. 993FIG. 990FIG. 991FIG. 992FIG. 990FIG. 9FIG. 7 illustrates a flow chart of a method 700 for synthesizing a circuit design. The method 700 is performed by the computer system 900 of FIG. 9. For example, a processor (e.g., the processing device 902 of FIG. 9) executes instructions (e.g., the instructions 926 of FIG. 9) stored in the memory (e.g., the main memory 904 or the machine-readable medium 924 of FIG. 9) to perform the method 700. The method 700 may be performed as part of a physical implementation 824 of FIG. 8.

At 710 of the method 700, the circuit design is received. The circuit design is an RTL file. For example, a computer system 900 receives, or obtains, the circuit design from a memory or another processing system.

At 720 of the method 700, the circuit design is synthesized based on a standard cell library. The computer system 900 synthesizes the circuit design based on a standard cell library. The standard cell library may be stored within a memory (e.g., the main memory 904 or the machine-readable medium 924 of FIG. 9). Further, the computer system 900 synthesizes the circuit design based on design constraints. The design constraints may be stored in a memory (e.g., the main memory 904 or the machine-readable medium 924 of FIG. 9). In one example, synthesizing the circuit design generates an intermediate netlist file (e.g., an object oriented netlist file).

At 730 of the method 700, a gate level netlist is generated from the intermediate netlist file generated at 720 of the method 700. The computer system 900 generates the gate level netlist from the intermediate netlist file. The gate level netlist is generated by routing the interconnections between the standard cell blocks based on the interconnect information of the circuit design.

At 740 of the method 700, the circuit design is partitioned into a plurality of standard cell blocks. For example, the computer system 900 partitions the gate level netlist of the circuit design into a plurality of standard cell blocks. The circuit design is partitioned into the plurality of standard cell blocks using the standard cell library.

At 750 of the method 700, standard cells and boundary cells are placed within the standard cell blocks. The computer system 900 places the standard cells and boundary cells based on the circuit design into the standard cell blocks to generate a layout file. The layout file is stored within the memory (e.g., the main memory 904 or the machine-readable medium 924 of FIG. 9). The layout file is used during manufacturing of a semiconductor device. For example, the layout file may be provided to a semiconductor manufacturing foundry to be used in manufacturing the semiconductor device. The standard cells are selected from a standard cell library stored within the memory, and placed to form the standard cell blocks. At 752 of the method 700, the standard cells are routed within each of the standard cell blocks. Further, each of the standard cell blocks are formed by placing boundary cells (e.g., boundary cells 500 of FIG. 5) selected from the standard cell library.

At 754 of the method 700, the computer system 900 determines the semiconductor type (e.g., p-type or n-type) of the boundary cells and places the boundary cells accordingly within the standard cell block. In example, the standard cell block may include about 10 to about 90 boundary cells along each boundary of the standard cell block.

In one example, the boundary cells are selected and placed based on the semiconductor type of the standard cells along the boundary region of a standard cell block. For example with reference to FIGS. 2-4, the standard cells 300 and 400 are included within the standard cell 210 and proximate the boundary of the standard cell block 200. For example, the standard cells 300 and 400 are the last cells before the boundary cells 220. In such an example, the semiconductor type of the region (layer) used to route the power supply lines 320 and 420 or the semiconductor type of the region used to route the power supply lines 330 and 430 is used to determine the semiconductor type of the boundary cells. In one example, the power supply lines 320 and 420 are disposed proximate the boundary cells 220 of the standard cell block 200. Accordingly, the semiconductor type of the boundary cells is based on the semiconductor type of the region used to route the power supply lines 320 and 420. Further, in one example, the power supply lines 330 and 430 are disposed proximate the boundary cells 220 of the standard cell block 200. Accordingly, the semiconductor type of the boundary cells is based on the semiconductor type of the layer used to route the power supply lines 330 and 430.

Figure 8:
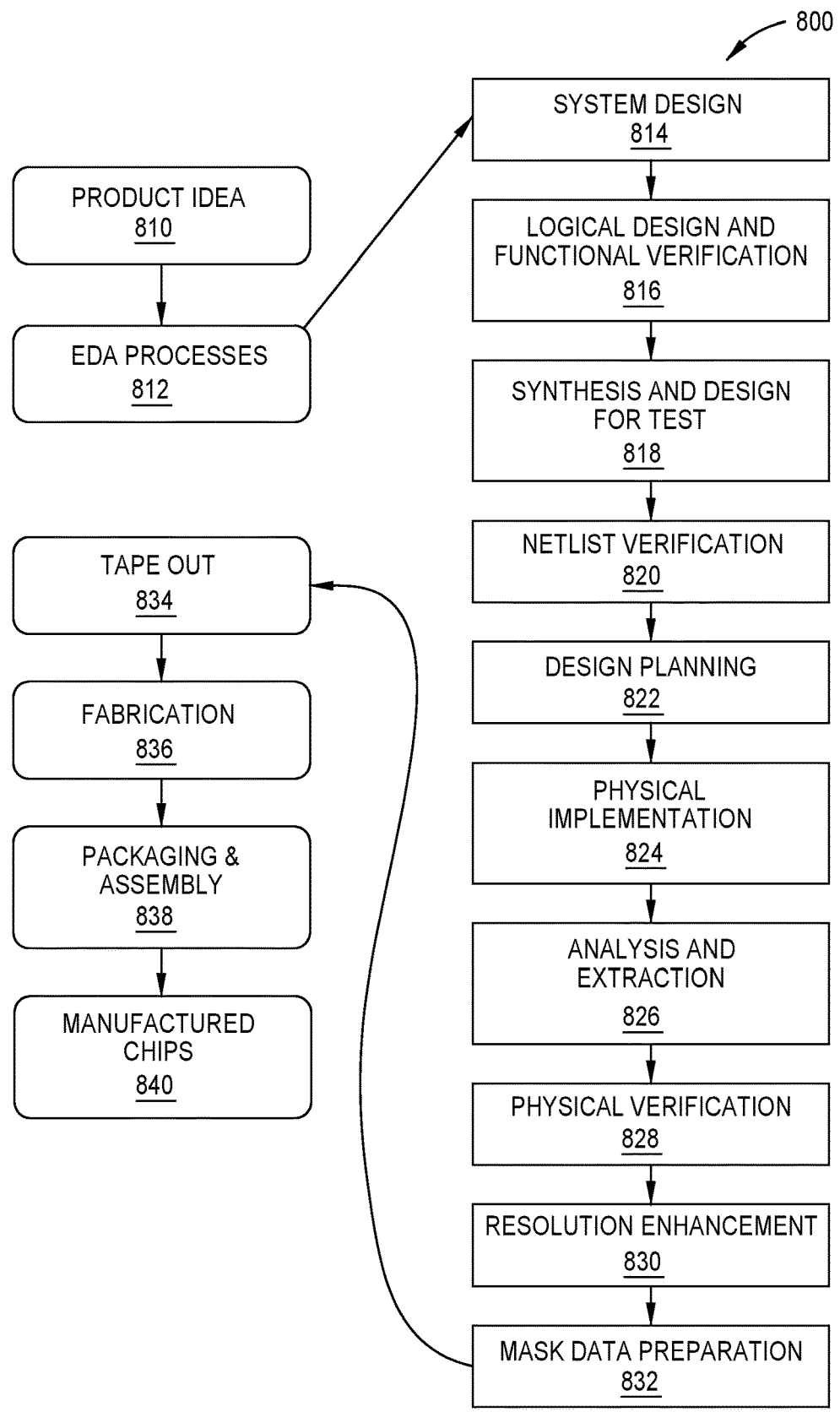
FIG. 8 depicts a flowchart of various processes used during the design and manufacture of an integrated circuit in accordance with some embodiments of the present disclosure.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 8. The processes described by be enabled by EDA products (or EDA systems).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 10) may be used to store the programs and data structures that are used by some or all of the EDA products described herein, and products used for development of cells for the library and for physical and logical design that use the library.

Figure 9:
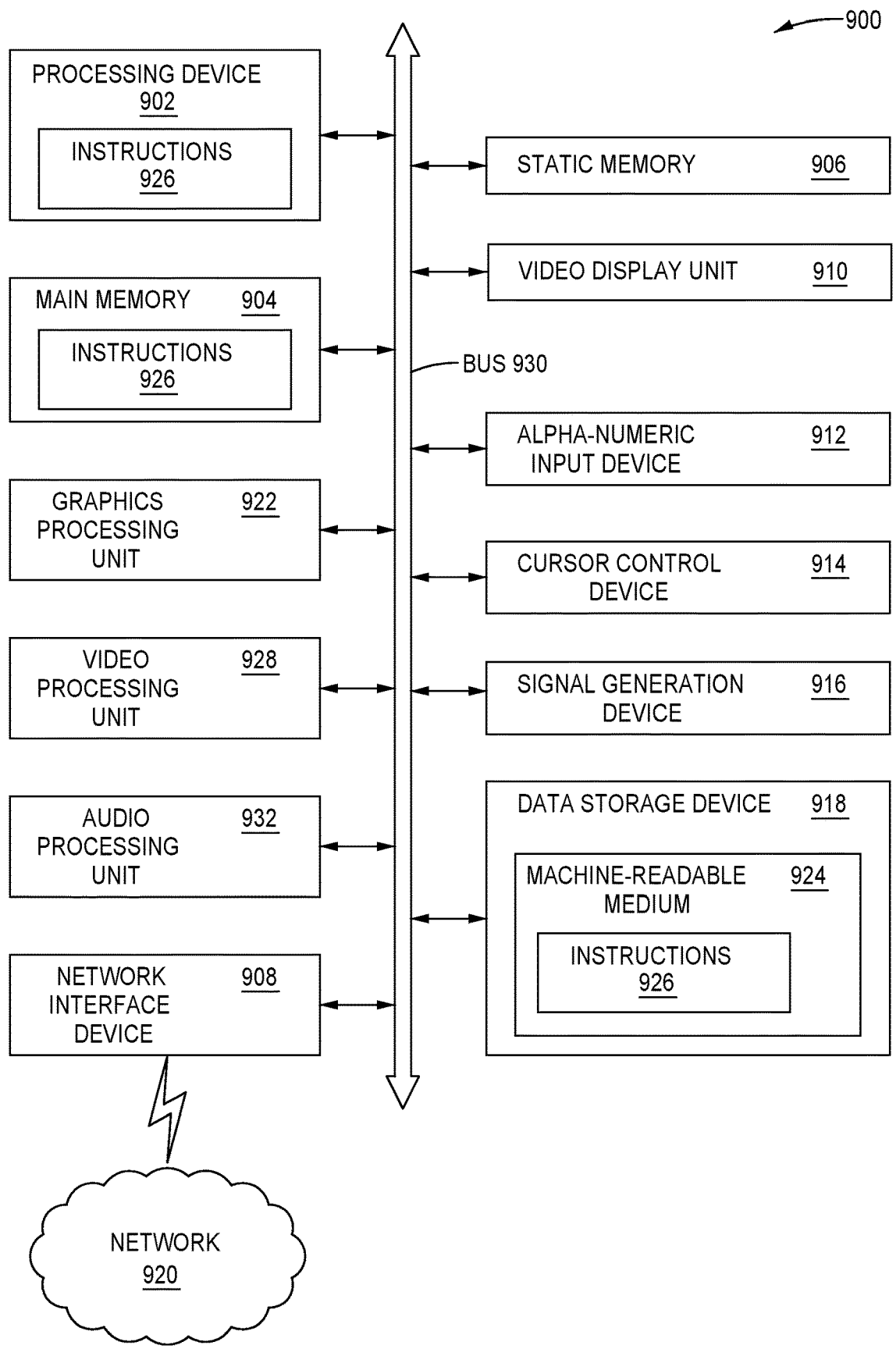
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A standard cell block for an integrated circuit device, the standard cell block comprising:
   standard cells interconnected to perform one or more functions of the standard cell block; and
   boundary cells disposed adjacent to the standard cells and along a boundary and an outer edge of the standard cells, the boundary cells comprising a first boundary cell comprising:
      a first region, a first dummy region, and a first layer extension region, the first region abutted with a first standard cell of the standard cells and the first dummy region, and the first dummy region is abutted with the first layer extension region, wherein the first region and the first dummy region each include one or more non-functional layers, wherein the first region, the first dummy region, and the first layer extension region are of a first semiconductor type, wherein the first region and the first dummy region overlap a second layer extension region of a second boundary cell of boundary cells of a second standard cell block, and the first layer extension region overlaps a second region and a second dummy region of the second boundary cell, and wherein two or more of the boundary cells are disposed adjacent to each other along the boundary and the outer edge.

2. The standard cell block of claim 1, wherein the first semiconductor type is a p-type or an n-type.

3. The standard cell block of claim 1, wherein a first placement and routing boundary is between the first layer extension region and the first dummy region.

4. The standard cell block of claim 3, wherein the first placement and routing boundary is aligned with a second placement and routing boundary of the second standard cell block.

5. The standard cell block of claim 4, wherein the second region, the second dummy region, and a second layer extension region of the second standard cell block are of the first semiconductor type.

6. The standard cell block of claim 4, wherein a height of the first layer extension region is greater than a height of the first region and a height of the first dummy region.

7. The standard cell block of claim 1, wherein the first standard cell comprises a power supply line routed in a third region of the first semiconductor type, wherein the first region is abutted with the third region.

8. A non-transitory computer readable medium comprising stored instructions, which when executed by a processor, cause the processor to:
   provide a first standard cell block, the first standard cell block comprising:
      standard cells of a standard cell library based on a circuit design, the standard cells interconnected to perform one or more functions of the first standard cell block; and
      boundary cells disposed adjacent to the standard cells and along a boundary and an outer edge of the standard cells, the boundary cells comprising a first boundary cell comprising:
         a first region, a first dummy region, and a first layer extension region, the first region abutted with a first standard cell of the standard cells and the first dummy region, and the first dummy region is abutted with the first layer extension region, wherein the first region and the first dummy region each include one or more non-functional layers, wherein the first region, the first dummy region, and the first layer extension region are of a first semiconductor type, wherein the first region and the first dummy region overlap a second layer extension region of a second boundary cell of boundary cells of a second standard cell block, and the first layer extension region overlaps a second region and a second dummy region of the second boundary cell, and wherein two or more of the boundary cells are disposed adjacent to each other along the boundary and the outer edge.

9. The non-transitory computer readable medium of claim 8, wherein the first semiconductor type is a p-type or an n-type.

10. The non-transitory computer readable medium of claim 8, wherein a first placement and routing boundary is between the first layer extension region and the first dummy region.

11. The non-transitory computer readable medium of claim 10, the first placement and routing boundary is aligned with a second placement and routing boundary of the second standard cell block.

12. The non-transitory computer readable medium of claim 11, wherein the second region, the second dummy region, and a second layer extension region of the second standard cell block are of the first semiconductor type.

13. The non-transitory computer readable medium of claim 8, wherein a height of the first layer extension region is greater than a height of the first region and a height of the first dummy region.

14. The non-transitory computer readable medium of claim 8, wherein the first standard cell comprises a power supply line routed in a third region of the first semiconductor type, wherein the first region is abutted with the third region.

15. A method comprising:
   placing standard cells of a standard cell library within a first standard cell block of a plurality of standard cell blocks; and
   placing boundary cells along a boundary and an outer edge of the standard cells, the boundary cells comprising a first boundary cell comprising:
      a first region abutting a second region of a first standard cell of the standard cells;
      a first dummy region abutting the first region, each of the first dummy region and the first region include a non-functional layer and overlap a second layer extension region of a second boundary cell of boundary cells of a second standard cell block; and
      a first layer extension region abutting the first dummy region, wherein the first region, the first dummy region, the first layer extension region, and the second region are of a first semiconductor type, the first layer extension region overlaps a third region and a second dummy region of the second boundary cell, and two or more of the boundary cells are disposed adjacent to each other along the boundary and the outer edge.

16. The method of claim 15, further comprising generating a gate level netlist by interconnecting the plurality of standard cell blocks.

17. The method of claim 15, wherein the first semiconductor type is a p-type or an n-type.

18. The method of claim 15, wherein a first placement and routing boundary is between the first layer extension region and the first dummy region.

19. The method of claim 15 further comprising:
   placing a second standard cell of the standard cell library within the second standard cell block of the plurality of standard cell blocks; and
   placing the second boundary cell along a boundary of the second standard cell block, wherein:
      the third region abuts a fourth region of the second standard cell;
      the second dummy region abuts the third region; and
      the second layer extension region abuts the second dummy region, wherein the third region, the second dummy region, the second layer extension region, and the fourth region are of the first semiconductor type.

20. The method of claim 15, wherein a first placement of the first standard cell block and routing boundary is aligned with a second placement and routing boundary of the second standard cell block.

* * * * *